(No Model.) 3 Sheets—Sheet 1.
H. B. MEECH.
CONCENTRATING AND AMALGAMATING MACHINE.
No. 340,142. Patented Apr. 20, 1886.
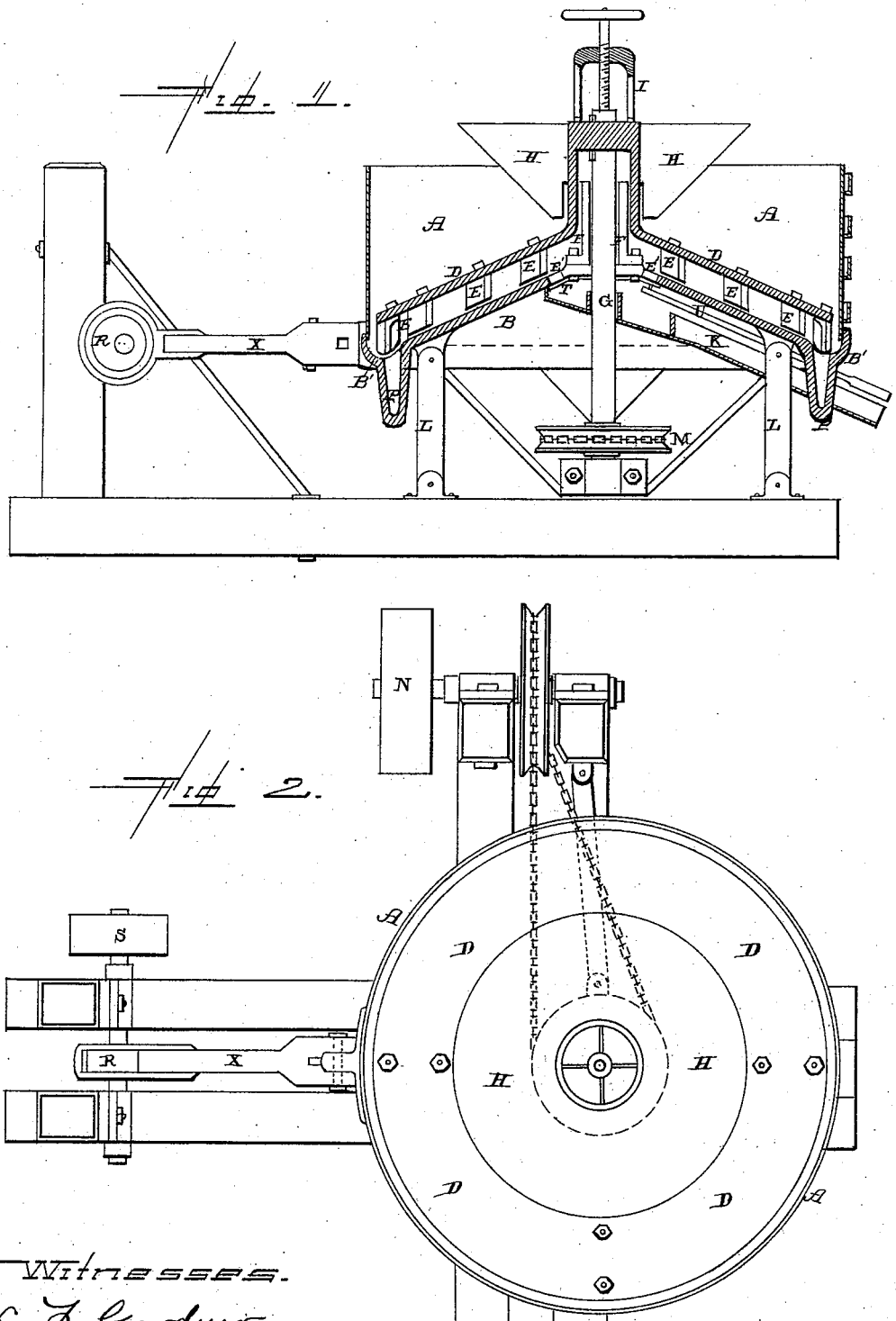

(No Model.) 3 Sheets—Sheet 2.
H. B. MEECH.
CONCENTRATING AND AMALGAMATING MACHINE.
No. 340,142. Patented Apr. 20, 1886.
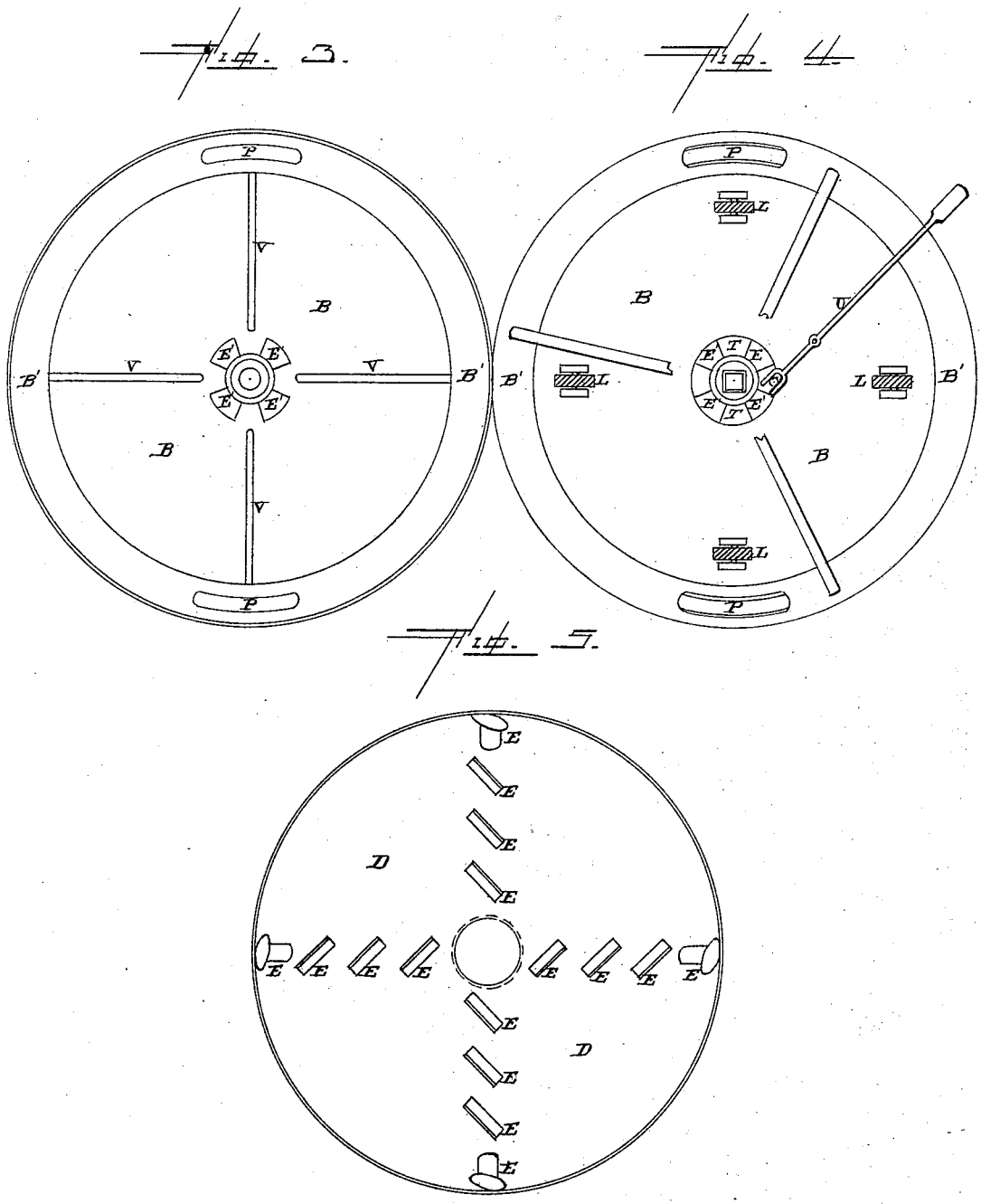

(No Model.)  3 Sheets—Sheet 3.
H. B. MEECH.
CONCENTRATING AND AMALGAMATING MACHINE.
No. 340,142. Patented Apr. 20, 1886.
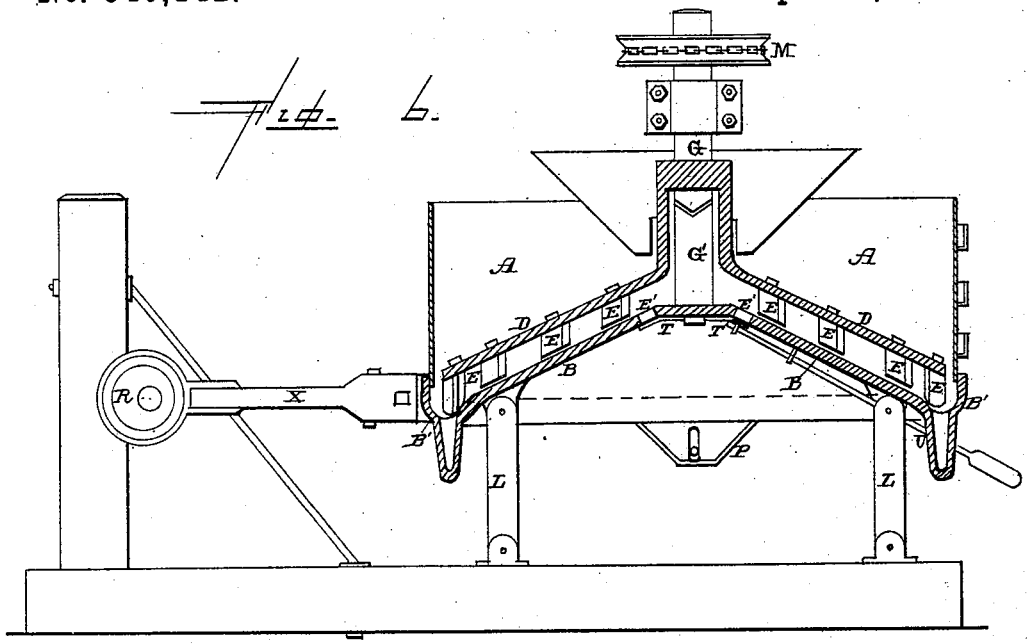
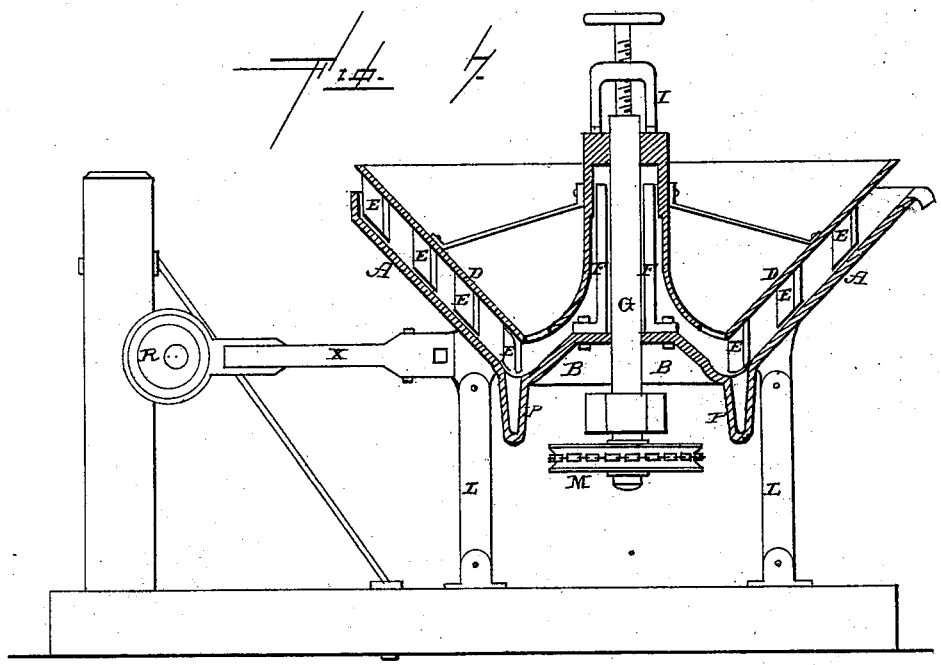

United States Patent Office.

HARRISON B. MEECH, OF CLEVELAND, OHIO.

CONCENTRATING AND AMALGAMATING MACHINE.

SPECIFICATION forming part of Letters Patent No. 340,142, dated April 20, 1886.

Application filed December 21, 1885. Serial No. 186,335. (No model.)

*To all whom it may concern:*

Be it known that I, HARRISON B. MEECH, of Cleveland, in the county of Cuyahoga and State of Ohio, have invented certain new and useful Improvements in Concentrating and Amalgamating Machines; and I do hereby declare the following to be a full, clear, and exact description of the invention, such as will enable others skilled in the art to which it pertains to make and use it, reference being had to the accompanying drawings, which form a part of this specification.

My invention relates to an improvement in concentrating and amalgamating machines; and it consists in, first, the combination of the pan having an inclined bottom and a mechanism for giving the pan a vibratory motion with a revolving iron disk, which is shaped so as to correspond to the bottom of the pan, and which is provided with mullers or friction-blocks, the hopper, which is attached to the disk, and a mechanism for causing the disk to revolve; second, the combination, in a concentrating and amalgamating machine, with a pan which has a vibratory movement, of a disk provided with mullers and which has a rotary movement at the same time that the pan has a reciprocating one, as will be more fully described hereinafter.

The object of my invention is to produce an amalgamating and concentrating machine in which the ore which is being reduced is subjected to a compound movement and made to flow up an incline plane at the same time that it is being subjected to a compound movement, and thus allow the light ores to be carried off while the heavy ores are concentrated.

Figure 1 is a vertical section of a machine embodying my invention. Fig. 2 is a plan view of the same. Figs. 3 and 4 are detached views of the bottom of the pan. Fig. 5 is an inverted view of the disk. Fig. 6 is a vertical section similar to what is shown in Fig. 1, with the driving mechanism for the disk placed on top. Fig. 7 shows a modification.

A represents the pan, which is of circular shape, and which has a series of openings made upon one side, so that a portion of its contents may be drawn off at any desired height. The bottom B of this pan is made of cast-iron, and preferably given the shape shown in Figs. 1 and 6, but which, if so desired, may be shaped as shown in Fig. 7. Around the outer edge of this bottom B is made a trough or recess, B', so as to catch all of the concentrated metal. At suitable intervals around this trough B' are formed pockets P of any suitable depth or shape, and which are cast as a part of the bottom, and into which the amalgamated or concentrated metal passes. Each one of these pockets is provided with a spring-actuated valve, through which this concentrating metal is drawn off whenever so desired. In this bottom B are also formed suitable grooves, V, which serve as guides to conduct into the trough B' all of the heavier portions of the ores which are not to be carried off by the flow through the pan.

Through the bottom of the pan, around its center, are a series of openings, E', through which the amount of ore and water passes. These openings are controlled by a suitable valve, T, which is operated by a rod, U, as shown in Fig. 4, so as to regulate the flow through the pan. Under these openings E is placed the trough K, through which the waste water and material is carried away.

Upon the under side of the bottom B are cast suitable ears, between which the upper ends of the supports L are pivoted. These supports are also pivoted at their lower ends upon any suitable base which may be provided for them.

Connected to the outer edge of the bottom B is a connecting-rod, X, and which rod is connected at its outer end to an eccentric, R, upon the shaft, which is driven by the pulley S. When motion is communicated to the eccentric R, the pan is given a rapid lateral vibratory movement, for the purpose of thoroughly shaking and agitating the ore which is being ground, and to cause the water and ore to work against the centrifugal force that is being imparted by the disk D, so that the light ore may be carried off, leaving the metals or heavy ores concentrated or amalgamated.

Bolted at the center of the bottom B is the hollow center stand, F, which acts as a box or bearing for the vertical shaft G, which passes through the center of the pan, as shown in Figs. 1 and 7. Secured to the lower end of this shaft G is a sprocket-wheel, M, around which passes a driving-chain. This chain also passes around a second sprocket-wheel, which is placed upon a horizontal shaft, which is provided with a driving pulley, N. When motion is communicated to the pulley N, the shaft G is made to revolve through the chain and sprocket-wheels. To this shaft, at its upper end, as shown in Figs. 1 and 7, is secured a disk, D, which is provided with the mullers or friction-blocks E on its under side. The hopper H is also secured to the central upper portion of the disk D, as shown in Figs. 1, 2, and 6.

When the shaft G is made to revolve, the disk D and the hopper are made to revolve with it. The ore is poured into the hopper, and from this hopper it passes down over the top of the disk into the trough B' in the bottom. The motion of the disk D carrying the mullers or friction-blocks, which are set at any suitable angle, as shown in Fig. 5, causes the ore and the water to pass up the inclined bottom B toward the opening C', and during the passage of the ore toward the center it is thoroughly ground by the mullers or blocks E. The ore which is being acted upon is caused to rise up an incline plane, so as to move against the centrifugal force which is given to it, and thus allow the lighter portion of the ore to be carried off while the heavier portions sinks back into the trough B'.

In Figs. 1 and 7, a stand, I, is connected with the top of the disk D, and through this stand is passed a set-screw, which bears upon the top of the shaft G, and thus regulates the pressure of the friction-blocks upon the bottom B. As shown in Fig. 6, the driving-power is applied to the shaft G above the pan instead of below it. In this case a support, G', is placed upon the top of the bottom B, and the disk D then rests upon its support, as shown.

In Figs. 1 and 6 the bottom B is shown inclined upward toward its center, and the disk D is made to conform to this shape; but in Fig. 7 the bottom B is inclined upward toward its outer edge, and the trough B' is near its center. Instead of having a separate hopper formed the disk is made concave, so as to form a hopper in itself, through which suitable openings are made for the ore and water to pass through. With the exception that the shapes of the bottom and the disks are slightly different, the machines are substantially the same. In one case the ore and water is discharged at the center, and in the other it is discharged at the outer edges.

Two driving mechanisms are placed at right angles to each other, as shown in Fig. 2, so that while the pan is being given a rapid lateral vibratory movement the disk is being given a rotary motion at the same time. The compound motion thus produced serves to concentrate all of the heavier metals and cause them to sink into the trough B', while only the lighter ore is allowed to escape.

It is immaterial whether the driving-power is applied to the shaft above or below the pan, as it is only necessary to impart a rotary motion to the disk at the same time that the pan reciprocates. The ore is pulverized to a suitable fineness and mixed with a suitable quantity of water, is fed into the hopper after the machine has once been set in motion, and then this ore passes over the revolving disk to the outer side of the pan, and then up between the disk and the bottom of the pan out at the opening near its center. The shaking of the pan settles the metal into the grooves and trough, and the revolving disk and mullers carry away the waste or light ore.

For amalgamating, quicksilver is placed in the grooves of the pan and held there until the ore has passed through the machine the same as for concentrating, and then the quicksilver and amalgam is drawn out through the spring-valves in the pockets.

I am aware that prior to my invention shaking and twisting pans on a stationary center have been used; but I am not aware that a lateral vibratory motion of the whole pan has been used in connection with a rotary motion.

Having thus described my invention, I claim—

1. The combination of the pan mounted upon rocking supports and a mechanism for giving the pan a reciprocating motion with the grinding disk having a revolving movement and a mechanism for causing the disk to revolve, the two operating mechanisms being placed at right angles to each other, substantially as shown.

2. The combination of the pan having a convex bottom which is provided with a trough around its outer edge and an opening through its center with the concave disk provided with a series of grinding surfaces or blocks, E, which extend from its outer edge inward, and which serve to force the pulp up the inclined bottom to the discharge-opening, substantially as described.

3. The combination of the pan A B B', mounted upon movable supports, with the rotary disk provided with grinding-blocks, the hopper which is attached to or forms a part of the disk, the driving-shaft, and the two operating mechanisms which are placed at right angles to each other, substantially as specified.

In testimony whereof I affix my signature in presence of two witnesses.

HARRISON B. MEECH.

Witnesses:
WILLIAM A. HARRINGTON,
GEO. A. GROOT.